Oct. 30, 1934.   E. A. DICKEY   1,979,100

PISTON EXPANDER

Filed Feb. 15, 1933

INVENTOR.
Edward A Dickey
BY
*C. M. Clarke*
ATTORNEY

Patented Oct. 30, 1934

1,979,100

UNITED STATES PATENT OFFICE 1,979,100

PISTON EXPANDER

Edward A. Dickey, Aliquippa, Pa.

Application February 15, 1933, Serial No. 656,849

8 Claims. (Cl. 309—12)

My invention consists of an improvement in pistons of the split or divided skirt type, for internal combustion engines.

In pistons of this class, various expedients have been utilized for expanding the divided portions of the skirt for compensating wear and adjusting the same to operative engagement with the cylinder walls, as in patent of Gibson No. 1,819,366, and others.

In my invention I utilize a bolt or bolts, the terminals of which extend freely through the strut or bridge walls of the piston, having freely movable abutments for engagement against the inner sides of the struts, and separate independently operative means exerting oppositely directed outward pressure thereon, and for positively locking the movable bearings in holding engagement therewith.

Certain preferred embodiments of the invention are illustrated in the accompanying drawing, in which.

Figure 1:
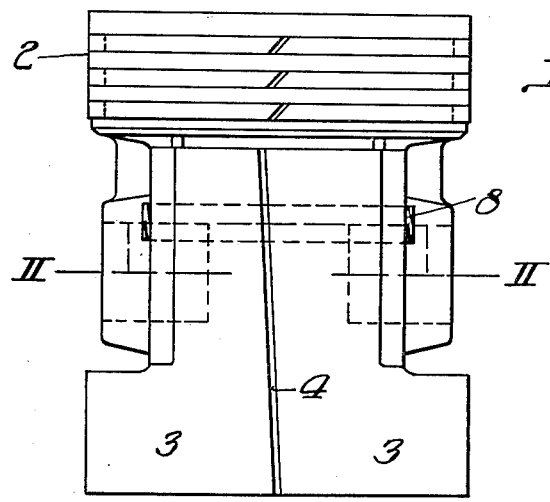
Fig. 1 is a view in front elevation of a piston provided with my improvement.

The piston as a whole is preferably made in one integral casting having the usual head 2 below which extends the skirt, the sides 3—3 of which are longitudinally divided by the usual slot 4.

The skirt is connected with head 2 by the struts or bridge walls 5 having the piston pin bearings 6 of standard construction.

At the slotted side, the connecting struts 5 are provided with transverse registering unthreaded bolt openings 7, preferably above or below the center line of bearings 6, insuring ample clearance for the adjusting bolt mechanism and its parts.

In the principal form of the construction shown, a continuously threaded bolt 8 is freely inserted through the unthreaded holes 7, and the bolt is provided at each end portion with a freely slidable bearing ring or abutment 9, resembling a washer.

An adjusting nut 10 and a companion locking nut 11 are mounted in threaded engagement with bolt 8, in oppositely located pairs, whereby nuts 10 may be accurately turned on the bolt to adjust the bearings 9 at each end outwardly against the struts 5, for proper distention thereof. Locking nuts 11 are then tightened against nuts 10, whereupon the divided skirt members 3 are positively located and fixedly held in desired position.

Bolt 8 is provided at one or both ends with means for holding it against rotation during turning of the nuts, as by a terminal bolt head or a screw driver slot 12.

Figure 2:
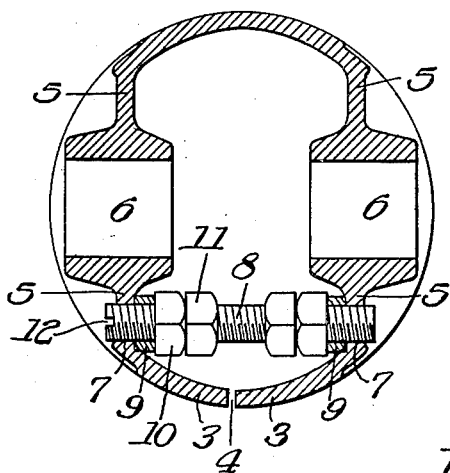
Fig. 2 is a transverse section thereof on the broken line II—II of Fig. 1.
Figure 3:
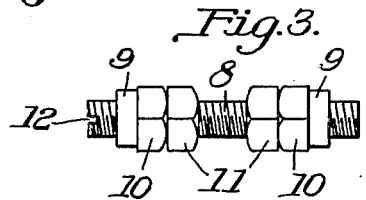
Fig. 3 is a detail view in elevation of one form of the adjusting bolt and its associated parts.

By such construction the bolt 8 may be freely inserted through one of the holes 7 part way, after which the bearings 9 and nuts 10 and 11, in two oppositely arranged sets, may be applied. The bolt may be then adjusted with its parts transversely of the piston to proper operative position, and the parts adjusted and tightened in operative relation to the struts, as in Fig. 2.

Figure 4:
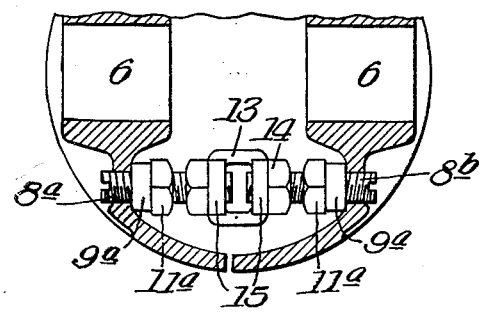
Fig. 4 is a partial cross section similar to Fig. 2, showing a modified construction, utilizing a turnbuckle.

I show also in Fig. 4 a modified construction in which I utilize a pair of bolts 8a and 8b, each having its loosely mounted washer bearing member 9a and a locking nut 11a therefor.

The bolts 8a and 8b are of right and left hand thread construction as shown, so as to be capable of equal distention outwardly, or contraction inwardly, by means of the middle connecting turnbuckle 13. In using this form of the invention, bearings 9a and nuts 11a having been fixedly located in approximate operative position, distending movement is then imparted by the turnbuckle to the proper extent for expansion of the skirts, whereupon the bolts are then locked in holding engagement with the turnbuckle by the lock nuts 14, one at each end of the turnbuckle.

Assemblage of the parts of such modified construction is easily facilitated by inserting each bolt section 8a and 8b inwardly through the unthreaded openings of the struts, from opposite sides, then through the bearings 9a, nuts 11a and 14, and into the nut terminals 15 of the turnbuckle, to the proper degree.

By easy and rapid application of a wrench or the like, the parts are then accurately adjusted and fixed in operative position, resulting in the desired fixed adjustment of the divided skirt members.

The application of either form of the invention is thus rendered easy and simple, and the bolt or bolts, or parts thereof, are of readily available design so that the simplicity and cost of the device is reduced to a minimum. It is easily available by anyone familiar with the construction and operation of pistons of the kind involved, and readily applied without the assistance of skilled labor, merely requiring boring of the holes 7.

It will be understood of course that the size or proportions of the adjusting mechanism may be readily changed or varied to suit varying sizes and dimensions of different piston constructions, and may be changed in specific details by the skilled mechanic within the scope of the following claims.

What I claim is:

1. A piston spreader for adjusting the strut walls of a divided piston provided with oppositely extending terminals of threaded bolts freely insertable through the opposite strut walls of the piston provided with freely movable bearing members, a holding nut for each bearing member, and means including lock nuts between the bolt terminals and their bearing members exerting outward pressure against the bearing members and locking said parts in position.

2. A piston spreader for adjusting the strut walls of a divided piston consisting of a threaded bolt freely insertable through the opposite strut walls of the piston provided with freely movable bearing members engageable against the inner faces of the walls, each provided with an independently adjustable holding nut.

3. A piston spreader for adjusting the strut walls of a divided piston consisting of a threaded bolt freely insertable through the opposite strut walls of the piston provided with freely movable bearing members engageable against the inner faces of the walls, each provided with an independently adjustable holding nut and a lock nut.

4. A piston spreader for adjusting the strut walls of a divided piston consisting of a threaded bolt freely insertable through the opposite strut walls of the piston provided with freely movable bearing members engageable against the inner faces of the walls, and oppositely located independently adjustable pairs of nuts, each pair comprising an adjusting nut and a lock nut whereby the bearing members may be positively adjusted outwardly to distend the piston walls and be positively held in position by the nuts.

5. In combination with a piston having a split skirt and substantially parallel struts, each of said struts being provided with an unthreaded opening, a continuously threaded bolt freely inserted through said openings, a bearing washer at each end portion of the bolt engaging the inner face of each side wall, an expanding nut on the bolt for each washer, and a lock nut therefor, both in threaded engagement with the bolt.

6. In combination with a piston having a split skirt and substantially parallel struts, each of said struts being provided with an unthreaded opening, a continuously threaded bolt freely inserted through said openings having at one end a holding slot, a bearing washer at each end portion of the bolt engaging the inner face of each side wall, an expanding nut on the bolt for each washer, and a lock nut therefor, both in threaded engagement with the bolt.

7. A piston spreader for adjusting the strut walls of a divided piston consisting of a threaded bolt freely insertable through the opposite strut walls of the piston provided with bearing members engageable against the inner faces of the walls, each provided with an independently adjustable holding nut threaded on the bolt.

8. The combination of a piston comprising a split expansible skirt having substantially parallel struts, each of said struts being provided with an unthreaded opening; and a piston expanding device, said device comprising oppositely threaded adjustable screw members, the outer ends of said screw members extending freely through said openings and the inner ends thereof terminating in a turnbuckle, and means on said screw members adjacent the outer ends thereof engaging said struts whereby said struts are maintained in expanded position.

EDWARD A. DICKEY.